Nov. 22, 1955 — R. F. McCARSON — 2,724,427
CONVERTIBLE BED AND CHILD'S SEAT
Filed July 29, 1953 — 2 Sheets-Sheet 1

INVENTOR.
Raymond F. McCarson
BY
ATTORNEY

Nov. 22, 1955   R. F. McCARSON   2,724,427
CONVERTIBLE BED AND CHILD'S SEAT
Filed July 29, 1953   2 Sheets-Sheet 2

INVENTOR.
Raymond F. McCarson
BY
ATTORNEY

United States Patent Office 2,724,427
Patented Nov. 22, 1955

2,724,427

CONVERTIBLE BED AND CHILD'S SEAT

Raymond F. McCarson, Asheville, N. C.

Application July 29, 1953, Serial No. 371,037

2 Claims. (Cl. 155—45)

This invention relates to a combination car seat and bed for an infant. More particularly the invention relates to a combination car seat and bed assembly which may be readily folded up in compact form and stored in a minimum of space when not in use.

Various attempts have been made to construct a useful combination infant car seat and bed unit but so far as is known no such unit has previously been made which is entirely satisfactory. For example, with many such devices, it is not possible for the adult passengers in the car to conveniently observe the infant when it is asleep in bed or to change its diaper or otherwise dress the infant while it lies on the bed unit. In addition, many of the prior devices are large and unwieldy and cannot satisfactorily be folded up for carrying or for storage when not in use.

It is an object of the present invention to provide a combination car seat and bed assembly for an infant which overcomes the foregoing disadvantages.

A further object is to provide a combination car seat and bed which occupies a minimum of space normally used by other passengers in the car.

A still further object is to provide a combination infant car seat and bed so constructed that an adult passenger in the front seat of the car may conveniently observe the infant at all times when it is occupying the bed unit with a minimum of interference with the comfort of the adult.

Another object is to provide a combination infant car seat and bed so designed that an adult passenger in the front seat of the car may dress, feed or otherwise attend to the infant lying in the bed unit with a minimum of discomfort on the part of the adult.

Other objects will appear from the description which appears below when taken in conjunction with the annexed drawings, wherein.

The combination infant car seat and bed assembly of the present invention is characterized principally by the fact that when it is installed in the car the bed portion of the assembly extends in cantilever fashion over the lap of a passenger sitting in the car, making all portions of the assembly or the infant thereon within convenient reach of the passenger. It is further characterized by the fact that it easily folds up in compact form for carrying or storage.

Figure 1:
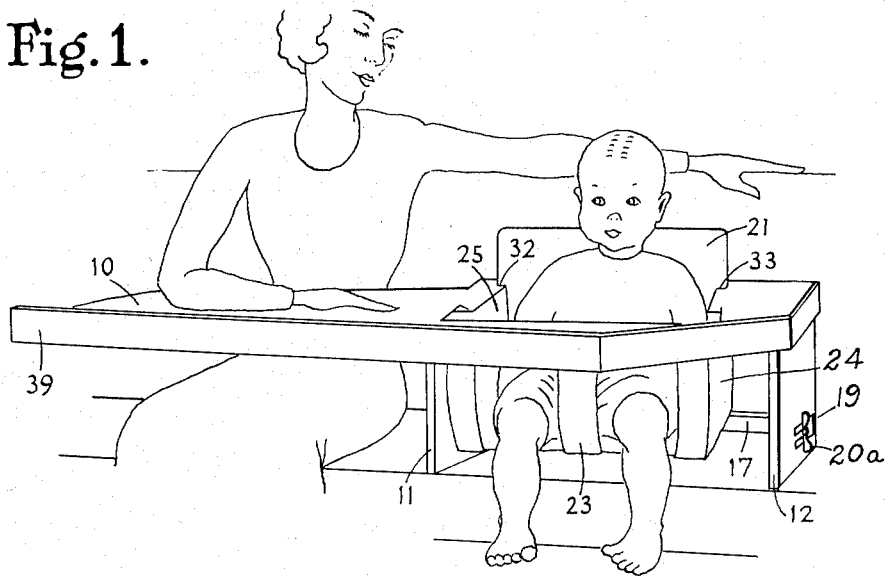
Figure 1 is a view in front elevation of a preferred embodiment of the invention installed in the front seat of an automobile.
Figure 2:
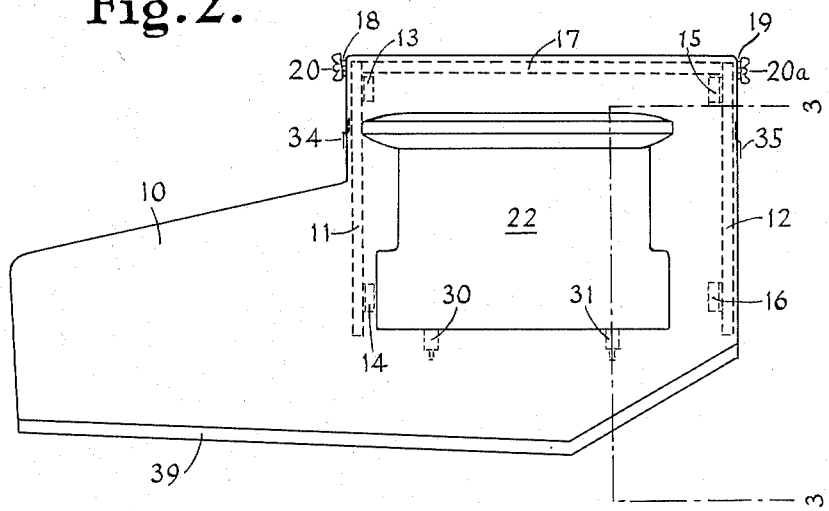
Figure 2 is a plan view of the apparatus shown in Figure 1.
Figure 4:
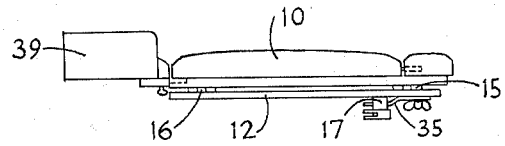
Figure 4 is an end view of the apparatus of Figure 1 folded up and ready for storage.

Referring now to Figures 1 and 2, the assembly comprises a relatively flat horizontal bed portion 10 unsupported at the left hand side and supported near the center and at the right hand side by vertical supporting members 11 and 12, respectively. The front edge of bed portion 10 is provided with a raised rim portion 39. Vertical member 11 is connected to the under side of horizontal portion 10 by means of hinges 13 and 14. Vertical member 12 is connected to the under side of horizontal portion 10 by means of hinges 15 and 16. This hinged construction permits vertical supporting members 11 and 12 to be folded toward each other and substantially flush against the bottom side of horizontal portion 10, as shown in Figure 4. It will be understood that the assembly is made so it may be used in the front seat of the average automobile; i. e., ordinarily the driver of the car would be occupying the seat to the right of the infant in Figure 1.

Figure 5:
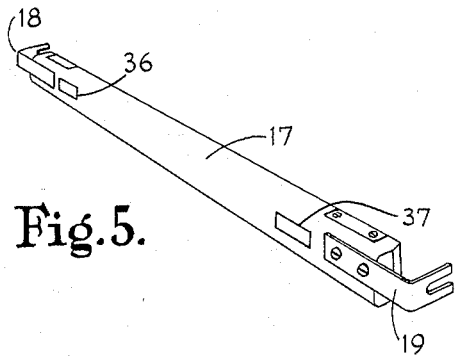
Figure 5 is a perspective view of a special spacer bar used in the invention.

A detachable spacer bar 17 (Figure 5) provided at each end with a bifurcated L-shaped extension 18, 19, extends between vertical members 11 and 12 when the assembly is being used. Bifurcated extensions 18, 19 coact with wing nuts 20, 20a mounted on the outer side of vertical members 11, 12, respectively. In this manner spacer bar 17 is maintained firmly in place and vertical members 11 and 12 are held upright.

Horizontal portion 10 is provided with a cut-out portion 21 which serves a dual purpose as the back of the infant seat and as part of the bed surface. The upper end of cut-out portion 21 is broader than the lower end and is provided with shoulders 32, 33. The lower end or more narrow end of cut-out portion 21 is attached to a rectangular bottom 22 of the infant seat, for example, by means of upholstery nails. The front strip 23 and sides 24 and 25 of the seat are attached at their upper end to horizontal portion 10 such as by tacks or nails and at their lower end to the bottom 22 of the seat. Twin openings for the infant's legs are formed on either side of front strip 23. Side members 24 and 25 are attached at the rear of the seat to the lower part of cut-out portion 21. Seat parts 22–25, inclusive, are made of a strong flexible material such as canvas. These parts may be joined by sewing or other means.

Figure 3:
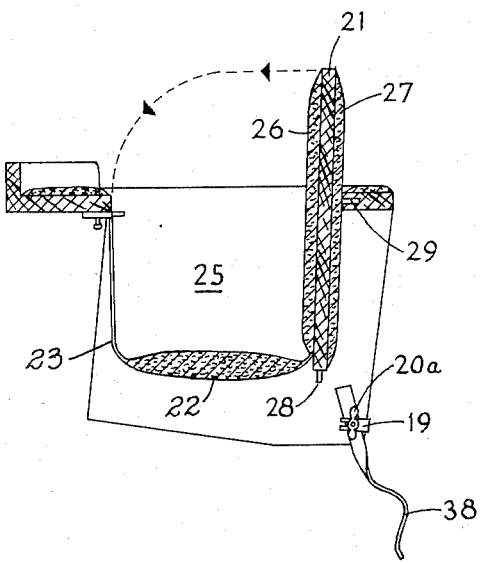
Figure 3 is a sectional view taken along the lines 3—3 of Figure 2.

As seen more clearly in Figure 3, cut-out portion 21 is padded or upholstered on both sides 26 and 27. The entire upper surface of horizontal portion 10, i. e., the surface to be contacted by the infant, is also upholstered. These upholstered portions are covered by a tough durable washable material such as a vinyl plastic coated cloth or the like. Protruding from the lower end of cut-out portion 21 are a plurality of metal pins indicated with the numeral 28. Pins 28 are adapted to enter corresponding recesses 29 in horizontal portion 10 when the cut-out portion 21 is disposed horizontally and the infant seat is not being used. When the cut-out portion 21 is in this position, the front side of it is supported by a pair of retractable pins 30, 31. Pins 30, 31 are mounted on the bottom side of horizontal portion 10 and may be the sliding pin type commonly used in a door latch mechanism.

The method by which the present device is converted from a bed to a seat or vice versa is believed to be fairly obvious from the above description. When the seat portion is in use, the cut-out portion 21 is held in place by the shoulders 32, 33 of the cut-out portion 21 resting on horizontal portion 10. The fact that cut-out portion 21 is attached to canvas sides 24 and 25 and canvas bottom 22 also tends to give it stability. When it is desired to convert to a bed, cut-out portion 21 is merely lifted up and pulled forward as indicated by arrows in Figure 3. Pins 28 fall into recesses 29 and the front edge of cut-out portion 21 becomes supported by previously set pins 30 and 31. The entire surface of horizontal portion 10 is then available for use as a bed or platform for dressing the infant. Since the bed portion extends in cantilever fashion over the lap of the passenger, it is a simple matter for the passenger to attend to the infant's needs.

When it is desired to remove the assembly from the auto for carrying or storage, it may quickly be folded up as follows. Wing nuts 20 and 20a are loosened and spacer bar 17 is removed. With cut-out portion 21 in the bed position flush with horizontal portion 10, vertical members 11 and 12 are folded in toward each other compressing the canvas seat between members 11 and 12 and cut-out portion 21. Members 11 and 12 are then secured in place by slipping locking strips 34, 35 on members 11 and 12, respectively, into the slots 36, 37 on spacer bar 17. Locking strips 34, 35 are Z-shaped metal strips attached to members 11, 12 by any suitable means such as by screws. As shown in Figure 4, this locks the members 11, 12 in place and the assembly is then neatly folded up into compact form for easy carrying or storage.

Tilting forward of the assembly while in use is prevented by curved member 38 shown in Figure 3. Member 38, which may be constructed of light metal, is designed to fit down behind the back of the car seat. Member 38 is preferably provided with a small hole so it may be securely attached to either of members 11 and 12 by wing nuts 20, 20a. If desired, a member 38 may be used on each of vertical members 11 and 12.

What is claimed is:

1. A combination car seat and bed comprising a horizontal member, a first vertical member pivotally connected to the bottom side of said horizontal member near the center thereof, a second vertical member pivotally connected to the bottom side of said horizontal member near one end thereof, a stabilizer bar extending between said vertical members and detachably secured thereto, said horizontal member having a portion cut out therefrom and movable between said vertical members to form the back for a seat, said back having lateral projections supported on said horizontal member and a flexible seat unit suspended from said back and said horizontal member between said vertical members, said horizontal member being wider at the end where said vertical members are connected than at the opposite end.

2. A combination car seat and bed comprising a horizontal platform member, a first vertical member transversely disposed on the bottom of said platform member near the center thereof and pivotally connected thereto, a second vertical member transversely disposed on the bottom of said platform member near one end thereof and pivotally connected thereto, a stabilizer bar extending between said vertical members and detachably secured thereto, said platform member having a portion cut out therefrom and movable between said vertical members to form the back for a seat, said back having lateral projections supported on said horizontal member and a flexible seat portion suspended from said back and said platform member underneath the opening for said movable portion, said platform member being wider at the end where said movable portion is located than at the opposite end whereby when said car seat and bed is in use in a car the narrow end of said platform member extends in cantilever fashion over seat space capable of being occupied by a passenger in the car.

References Cited in the file of this patent

UNITED STATES PATENTS

| | | |
|---|---|---|
| 2,433,504 | Zimmerman | Dec. 30, 1947 |
| 2,464,939 | Puls | Mar. 22, 1949 |
| 2,488,225 | Mover | Nov. 15, 1949 |
| 2,650,374 | Pierce | Sept. 1, 1953 |